United States Patent
Ma et al.

(10) Patent No.: US 10,209,435 B2
(45) Date of Patent: Feb. 19, 2019

(54) BACKLIGHT MODULE AND LIQUID CRYSTAL DISPLAY

(71) Applicants: HISENSE ELECTRIC CO., LTD., Shan Dong Province (CN); Hisense USA Corp., Suwanee, GA (US); HISENSE INTERNATIONAL CO., LTD., Shandong (CN)

(72) Inventors: Jihang Ma, Shandong (CN); Hui Wang, Shandong (CN); Jiguang Zhang, Shandong (CN)

(73) Assignees: HISENSE ELECTRIC CO., LTD., Shandong (CN); HISENSE USA CORPORATION, Suwanee, GA (US); HISENSE INTERNATIONAL CO., LTD., Shandong (CN)

( * ) Notice: Subject to any disclaimer, the term of this patent is extended or adjusted under 35 U.S.C. 154(b) by 89 days.

(21) Appl. No.: 15/084,197

(22) Filed: Mar. 29, 2016

(65) Prior Publication Data
US 2017/0090114 A1 Mar. 30, 2017

(30) Foreign Application Priority Data
Sep. 30, 2015 (CN) .......................... 2015 1 0635350

(51) Int. Cl.
*F21V 8/00* (2006.01)
*G02F 1/1335* (2006.01)

(52) U.S. Cl.
CPC ......... *G02B 6/0091* (2013.01); *G02B 6/0023* (2013.01); *G02B 6/0026* (2013.01); *G02F 1/133615* (2013.01)

(58) Field of Classification Search
CPC ............................. G02B 6/0026; G02B 6/0091
See application file for complete search history.

(56) References Cited

U.S. PATENT DOCUMENTS

| | | | | |
|---|---|---|---|---|
| 9,341,767 B2* | 5/2016 | Jeong | ................... | G02B 6/0093 |
| 9,360,614 B2* | 6/2016 | Lee | ...................... | G02B 6/0023 |
| 9,772,441 B2* | 9/2017 | Abe | ...................... | G02B 6/0088 |
| 9,915,777 B2* | 3/2018 | Bae | ...................... | G02B 6/0086 |
| 2008/0088763 A1* | 4/2008 | Toriyama | ............. | G02B 6/0091 349/58 |
| 2013/0336003 A1* | 12/2013 | Yang | ........................ | G02B 6/42 362/608 |
| 2014/0240644 A1* | 8/2014 | Abe | ...................... | G02B 6/0088 349/71 |
| 2015/0098247 A1* | 4/2015 | Shin | ..................... | G02B 6/0073 362/611 |
| 2015/0212260 A1* | 7/2015 | Li | ........................ | G02B 6/0086 362/608 |
| 2015/0226904 A1* | 8/2015 | Bae | ...................... | G02B 6/0023 362/608 |
| 2015/0226996 A1* | 8/2015 | Ohashi | ................. | G02B 6/0011 348/725 |

(Continued)

*Primary Examiner* — William N Harris
(74) *Attorney, Agent, or Firm* — McDermott Will & Emery LLP

(57) ABSTRACT

The present disclosure discloses a backlight module and a liquid crystal display, which relates to the technical field of liquid crystal display. A quantum tube bracket of the backlight module is fixed on the bracket mounting portion by means of a single point of fixation along a length direction of the quantum tube.

20 Claims, 7 Drawing Sheets

(56) References Cited

U.S. PATENT DOCUMENTS

2015/0293292 A1* 10/2015 Lee .................. G02B 6/0026
                                                    362/608
2016/0341874 A1* 11/2016 Fan .................. G02B 6/0091
2017/0357049 A1* 12/2017 Abe .................. G02B 6/0091

* cited by examiner

BACKLIGHT MODULE AND LIQUID CRYSTAL DISPLAY

CROSS REFERENCE OF RELATED APPLICATION

The present application claims benefit and priority of a Chinese patent application No. 201510635350.X filed on Sep. 30, 2015 and titled as a backlight module and a liquid crystal display, and all contents thereof are incorporated herein by reference.

FIELD OF TECHNOLOGY

The present disclosure relates to the technical field of liquid crystal display, and particularly, to a backlight module and a liquid crystal display.

BACKGROUND

Currently, the liquid crystal display is widely used in various electronic products. With the continuous development of society, users have higher and higher requirement of the display screen color vividness of the liquid crystal display, which requires the color gamut of the liquid crystal display to be increasingly higher.

Usually, the liquid crystal display includes a liquid crystal panel and a backlight module that provides display backlight to the liquid crystal panel. The backlight module is one of the most important components of the liquid crystal display, and the color gamut of the display backlight provided by it directly determines the color gamut of the liquid crystal display. Generally, the color gamut of the display backlight is improved by applying quantum dots in the backlight module. For example, a quantum tube is formed by encapsulating quantum dots into a glass tube, and light emitted from a light source in the backlight module passes through the glass tube to excite quantum dots in the glass tube, so as to produce display backlight of a high color gamut.

In the prior art, the quantum tube is usually mounted and fixed with a plastic bracket to achieve a safe fixation of the quantum tube. As shown in FIG. 1, a quantum tube 40a is mounted in the quantum tube receiving cavity of a plastic bracket 20a that is completely fixed on an aluminum profile 10a through several screws 60a.

During the researches, the inventor finds that after the plastic bracket 20a and the aluminum profile 10a are heated, the elongation amount of the plastic bracket between two fixing screws 60a is larger than the elongation amount of the aluminum profile 10a between the two fixing screws 60a since the thermal expansion coefficient of the plastic bracket 20a is larger than that of the aluminum profile 10a. As a result, the plastic bracket 20a is bent and deformed, and the glass tube of the quantum tube 40a has a poor plasticity, thus the quantum tube 40a finally will be bent and broken.

SUMMARY OF THE DISCLOSURE

The embodiments of the present disclosure provide a backlight module, comprising:

a bracket mounting portion provided with an edge type light source and at least one quantum tube bracket, the thermal expansion coefficient of the quantum tube bracket being larger than that of the bracket mounting portion;

a light guide plate including a light incident surface and a light emergent surface, the light incident surface being directly opposite to the edge type light source;

a quantum tube mounted between the edge type light source and the light incident surface by the at least one quantum tube bracket;

wherein the quantum tube bracket is fixed on the bracket mounting portion by means of a single point of fixation along a length direction of the quantum tube.

Further, the embodiments of the present disclosure provide a liquid crystal display comprising the backlight module.

BRIEF DESCRIPTION OF THE DRAWINGS

In order to describe the technical solutions of the embodiments of the present disclosure more clearly, the drawings to be used in the descriptions of the embodiments or the prior art are briefly introduced as follows. Obviously, the drawings in the following description just illustrate some embodiments of the present disclosure, and a person skilled in the art can obtain other drawings from them without paying any creative effort

DETAILED DESCRIPTION OF THE PREFERRED EMBODIMENTS

The technical solutions of the embodiments of the present disclosure will be clearly and completely described below with reference to the drawings of the embodiments of the present disclosure. Obviously, those embodiments described are just a part, rather than all of the embodiments of the present disclosure. On the basis of the embodiments of the present disclosure, any other embodiments obtained by a person skilled in the art without paying any creative effort shall fall within the protection scope of the present disclosure.

The embodiments of the present disclosure provide some backlight modules, as shown in FIGS. 2 to 10. Next, the backlight modules provided by the embodiments of the present disclosure will be described in details with reference to the drawings.

Figure 1:
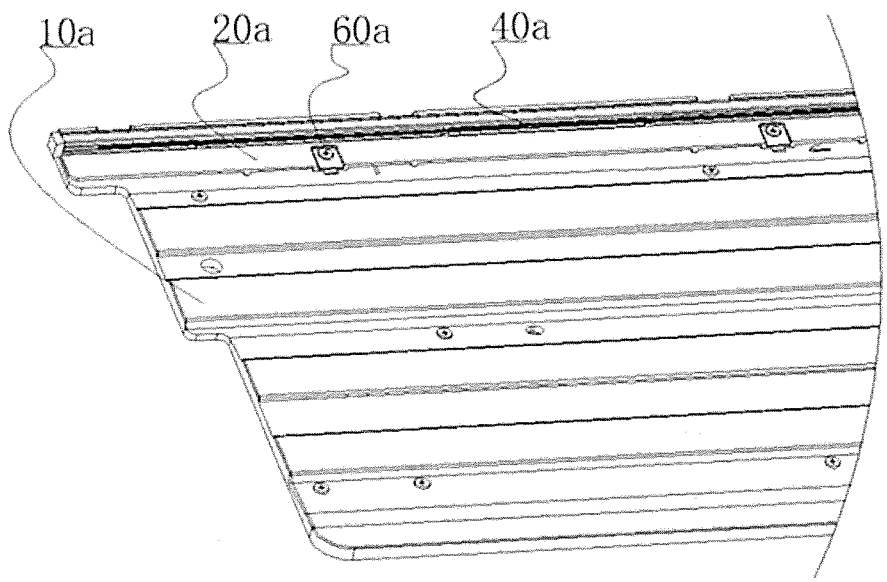
FIG. 1 is a schematic diagram of a mounted structure of a quantum tube of a backlight module in the prior art.
Figure 2:
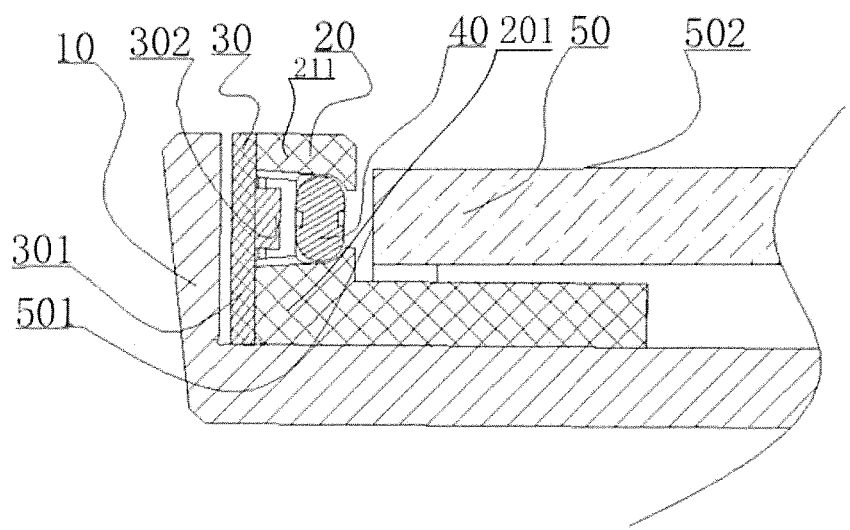
FIG. 2 is a schematic diagram of a structure of a backlight module in one embodiment of the present disclosure.

Referring to FIG. 2, the backlight module provided by the embodiments of the present disclosure at least includes: an edge type light source 30 comprising a substrate 301 and several light sources 302 mounted on the substrate 301, wherein the substrate 301 may be a printed circuit board (PCB), and the light source 302 may be a laser lamp or an LED lamp, which are not limited herein; a light guide plate 50 comprising a light incident surface 501 directly opposite to the edge type light source 30, and a light emergent surface 502 directly opposite to the liquid crystal screen of the liquid crystal display, wherein the material and structure of the light guide plate 50 are not limited herein, and a person skilled in the art may refer to the prior art; a quantum tube 40 formed by encapsulating quantum dots within a transparent glass tube, and fixed between the edge type light source 30 and the light incident surface 501 of the light guide plate 50 by at least one quantum tube bracket 20. In which 'at least one quantum tube bracket 20' is refer to one quantum tube bracket 20 or more than one quantum tube bracket 20, and then the description of 'the quantum tube bracket' hereinafter relates to the one quantum tube bracket 20 or each one of the quantum tube brackets 20. Since the glass tube may be broken under a small bending deformation due to poor plasticity and bending resistance of the glass material, the bending deformation of the quantum tube 40 shall be reduced as much as possible during the usage.

To be noted, the plasticity mentioned in the embodiments of the present disclosure actually refers to elasticity, i.e., deformability.

In another embodiment of the present disclosure, the quantum tube 40 may also be formed by encapsulating quantum dots within other transparent tube in addition to the transparent glass tube. When plasticity and bending resistance of the above transparent tube are similar to those of the transparent glass tube, the bending deformation of the quantum tube 40 shall also be reduced as much as possible.

Referring to FIG. 2, light emitted from the edge type light source 30 passes through the transparent glass tube to excite quantum dots encapsulated in the transparent glass tube. The excited quantum dots produce white light of high color gamut, which enters the light guide plate 50 through the light incident surface 501 of the light guide plate 50, so as to provide a display backlight of high color gamut to the backlight module. Thus, as can be seen from FIG. 2, the quantum tube 40 needs to be directly opposite to the edge type light source 30 and the light incident surface 501 of the light guide plate 50.

Figure 6:
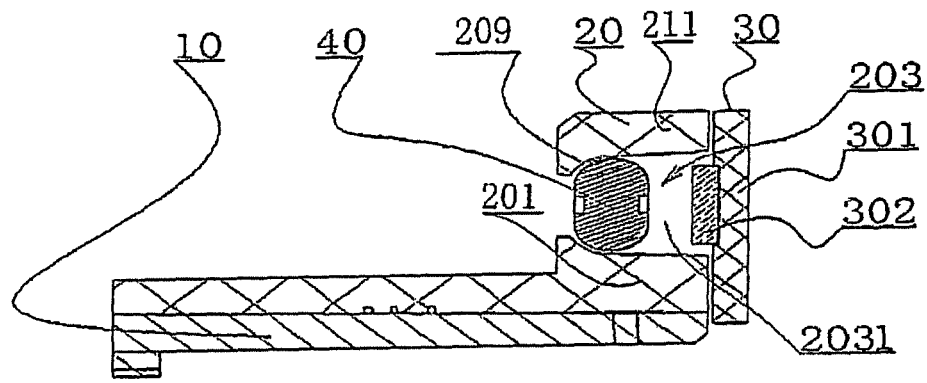
FIG. 6 is a schematic diagram of B-B sectional structure of FIG. 5.
Figure 7:
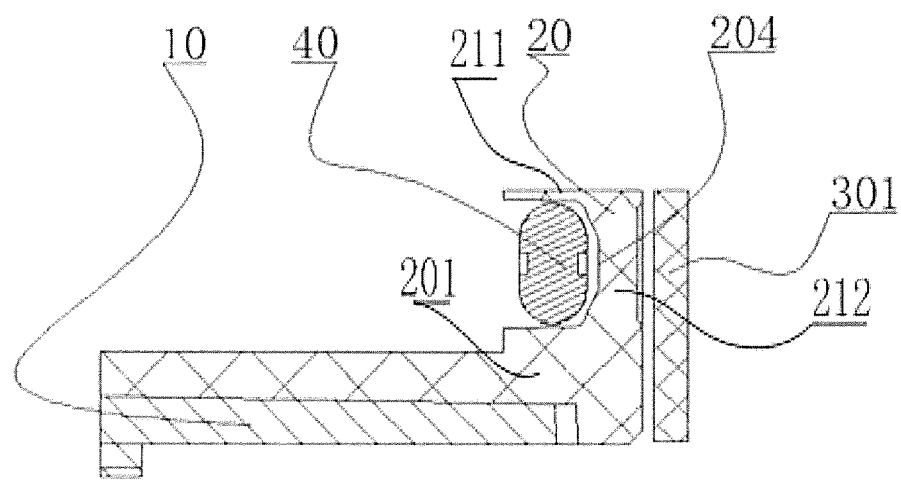
FIG. 7 is a schematic diagram of C-C sectional structure of FIG. 5.

The structure of the quantum tube bracket 20 is shown in FIGS. 2, 6, 7, 9 and 10. The quantum tube bracket 20 comprises a base 201, a side wall 212 which extends away from the base 201, and a top wall 211 which extends away from the side wall in a direction that is parallel to the base 201. As shown in FIG. 7, the base 201, the side wall 212, and the top wall 211 forms a quantum tube receiving cavity 203 extending upward along the base 201. Referring to FIGS. 6 and 7, the side wall 212 is provided with at least one through-hole 2031, through which light is transmitted from the edge type light source 30 to the quantum tube. FIG. 6 is a sectional view of the backlight module where there is a through-hole in the side wall 212, and FIG. 7 is a sectional view of the backlight module where there is no through-hole in the side wall 212. The quantum tube 40 is located in the quantum tube receiving cavity 203 which has a profiling design to effectively prevent the quantum tube 40 from rotating in the quantum tube receiving cavity 203, and ensure that the effective luminous region of the quantum tube 40 is exposed and always directly opposite to the light incident surface 501 of the light guide plate and the edge type light source 30. In order to meet the above requirement, the quantum tube bracket 20 provided by the embodiments of the present disclosure, as shown in FIGS. 6 and 7, is provided with an upper protrusion 209 for performing a profiling limitation to the quantum tube together with the base 201, and a vertical rib 204 for connecting the upper protrusion 209 and the base 201. It is required that the upper protrusion 209 and the vertical rib 204 have widths as low as possible while meeting the strength requirement, so as to reduce the shielding of the effective luminous region of the quantum tube 40.

Figure 3:
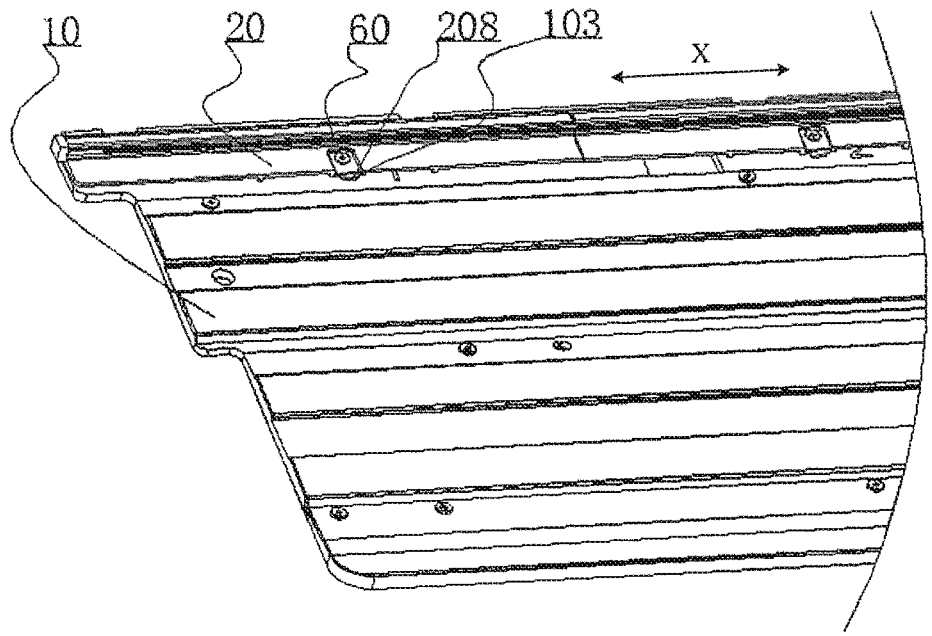
FIG. 3 is a schematic diagram of an assembled structure of a quantum tube bracket and a bracket mounting portion in one embodiment of the present disclosure.

Referring to FIGS. 2 and 3, the backlight module provided by one embodiment of the present disclosure comprises a bracket mounting portion 10 provided with an edge type light source 30 and at least one quantum tube bracket 20. As to the backlight module provided by one embodiment of the present disclosure, a heat dissipation profile of the backlight module may act as the bracket mounting portion 10. In another embodiment, a backboard of the backlight module may act as the bracket mounting potion 10.

For the convenience of description, the embodiments pf the present disclosure take the heat dissipation profile as an example of the bracket mounting portion 10. Of course, the description is exemplary, and the present disclosure is not limited thereto.

In which, the heat dissipation profile in the one embodiment of the present disclosure is mainly used for achieving a fast heat dissipation of the LED lamp in the edge type light limited herein, and a person skilled in the art may refer to the prior art. In which, the heat dissipation profile usually uses a metal material due to its good heat-conducting property. Preferably, the heat dissipation profile is extrusion-formed with the aluminum profile due to its cheap price, good heat dissipation effect and low machining cost.

Figure 9:
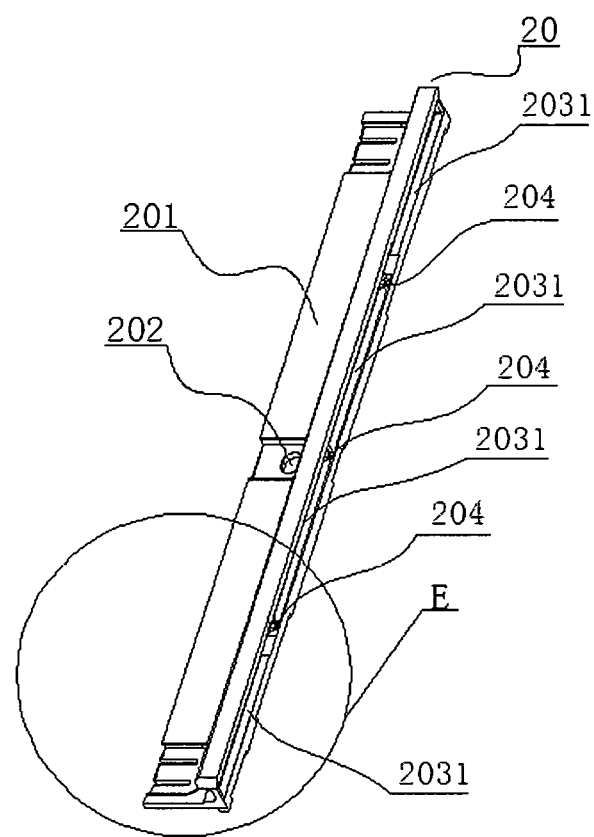
FIG. 9 is an isometric view of a quantum tube bracket in a separated state in one embodiment of the present disclosure.
Figure 10:
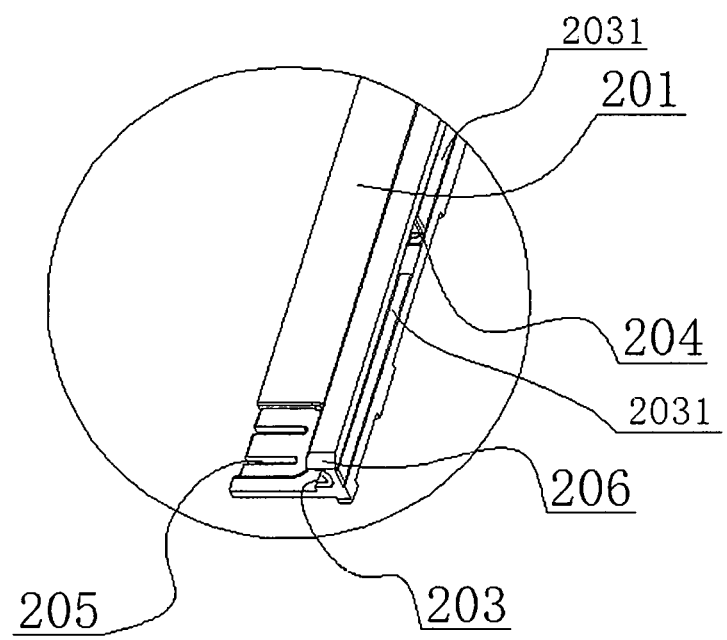
FIG. 10 is a schematic diagram of a local enlarged structure of portion E of FIG. 9.

Referring to FIG. 9, the quantum tube bracket 20 is provided with a screw hole 202. For example, the screw hole 202 is provided on the base 201 of the quantum tube bracket 20 to perform a screw limitation between the quantum tube bracket 20 and the bracket mounting portion 10. Referring to FIG. 3, the quantum tube brackets 20 are mounted on the bracket mounting portion 10, and the displacement in the vertical direction of each quantum tube bracket 20 is limited by a screw 60 in the screw hole 202. Meanwhile, the screw 60 also limits the displacement of each whole quantum tube bracket 20 on the bracket mounting portion 10 in the length direction and the width direction.

In conclusion, in the backlight module provided by one embodiment of the present disclosure, the quantum tube bracket 20 is mounted on the bracket mounting portion 10 through the screw 60. Referring to FIG. 3, there is only one limiting point, i.e., the screw 60, between each quantum tube bracket 20 and the bracket mounting portion 10 along the length direction of the quantum tube 40. That is, the quantum tube bracket 20 is fixed on the bracket mounting portion 10 by means of a single point of fixation along the length direction of the quantum tube 40, wherein the length direction of the quantum tube 40 is direction X as shown in FIG. 3, thus the quantum tube bracket 20 can freely expand and extend towards both sides from the fixing point, i.e., the screw 60, on the bracket mounting portion 10 along the length direction of the quantum tube 40.

Of course, as to the backlight module provided by the embodiments of the present disclosure, there may be other embodiments where the quantum tube bracket 20 is fixed on the bracket mounting portion 10 by means of a single-point of fixation along the length direction of the quantum tube 40.

Figure 3A:
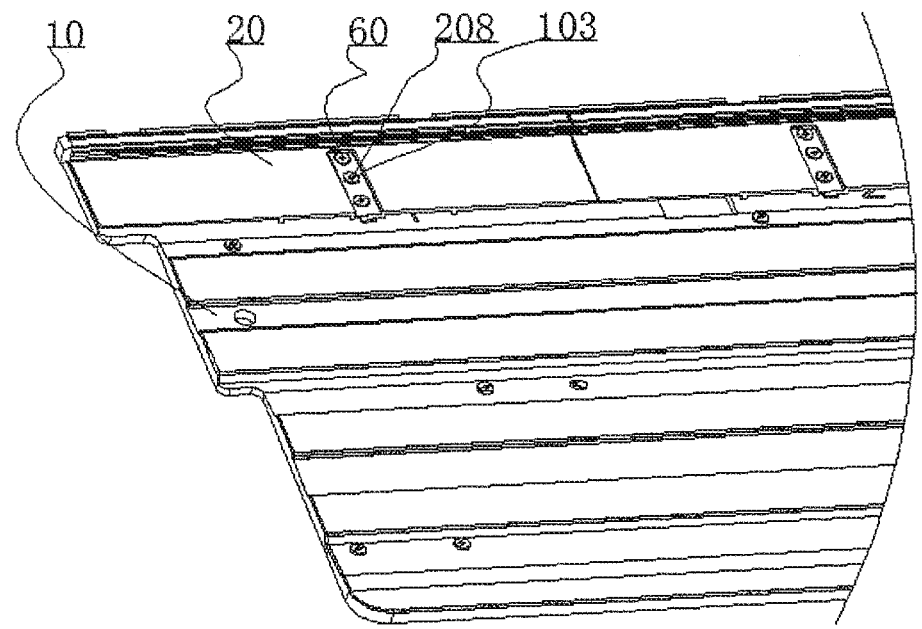
FIG. 3a is a schematic diagram of a structure of a modified embodiment of FIG. 3.

For example, referring to FIG. 3a, the quantum tube brackets 20 are mounted on the bracket mounting portion 10 through several screws 60 arranged side by side along the width direction of the quantum tube 40, and herein 'several' means at least two. In that case, the fixing effect of the quantum tube bracket 20 along the length direction of the quantum tube 40 is the same as the fixing effect of that using the single screw 60 in FIG. 3. Thus in the embodiment of FIG. 3a, each quantum tube bracket 20 is also fixed on the bracket mounting portion 10 by means of a single point of fixation along the length direction of the quantum tube 40. In that case, each quantum tube bracket 20 can also freely expand and extend towards both sides from the fixing point, i.e., the screws 60, on the bracket mounting portion 10 along the length direction of the quantum tube 40.

The above 'a single point of fixation' means that there is only one contact area between the bracket mounting portion 10 and each quantum tube bracket 20, and when the quantum tube bracket 20 is thermally expanded, the single contact area does not hinder the extension of the quantum tube bracket 20 along the length direction of the quantum tube 40.

Generally, the quantum tube bracket 20 is injection-molded with plastics, and its thermal expansion coefficient is larger than that of the bracket mounting portion 10, i.e., on unit length, the expansion and elongation amount of the quantum tube bracket 20 is larger than that of the bracket mounting portion 10, which can easily cause a bending deformation of the quantum tube bracket 20 fixed on the bracket mounting portion 10. However, in the backlight modules provided by the embodiments of the present disclosure, the quantum tube bracket 20 can freely expand and extend towards both sides from the screw 60 on the bracket mounting portion 10 along the length direction of the quantum tube 40, which effectively avoids the quantum tube bracket 20 from being bent since its thermal elongation amount is larger than the elongation amount of the heat dissipation profile, solves the problem that the quantum tube 40 is broken due to the expansion and bending of the quantum tube bracket 20, and thus improves the service life and safe reliability of the quantum tube 40.

Further, in the working process of the quantum tube 40 of the backlight module, the effective luminous region thereof shall be always directly opposite to the edge type light source 30 and the light incident surface 501 of the light guide plate. Thus, the quantum tube 40 shall be fixed accurately between the edge type light source 30 and the light incident surface 501 of the light guide plate by the at least one quantum tube bracket 20. When the quantum tube bracket 20 is fixed on the bracket mounting portion 10 by means of a single point of fixation along the length direction of the quantum tube 40, a deflection may occur because the fixing is not so firm. In order to prevent the deflection of the quantum tube bracket 20, the embodiments of the present disclosure provide a backlight module, as shown in FIGS. 3b, 4, 8 and 10, in which the base 201 of the quantum tube bracket 20 is provided with at least one insertion tongue 205. Optionally, the at least one insertion tongue 205 may be provided on the lower surface of the base 201 of the quantum tube bracket 20. At least one insertion hole 101 fitted with the at least one insertion tongue 205 respectively is provided at corresponding position on the bracket mounting portion 10, and when the quantum tube bracket 20 is mounted on the bracket mounting portion 10, the insertion tongue 205 is located inside the insertion hole 101. Referring to FIG. 4, the insertion tongue 205 and the insertion hole 101 are fitted with each other to prevent each quantum tube bracket 20 from rotating around the screw(s) 60 thereof on the bracket mounting portion 10.

In one embodiment, the insertion tongue 205 and the insertion hole 101 are fitted with each other at zero clearance in the width direction of the quantum tube bracket 20. The insertion tongue 205 and the screw 60 are engaged with each other to limit the displacement of the quantum tube bracket 20 on the bracket mounting portion 10 in the width direction, so as to achieve an accurate location of the quantum tube bracket 20 on the bracket mounting portion 10 along the width direction of the quantum tube 40. In one embodiment, the insertion tongue 205 and the screw hole 202 are arranged side by side in the length direction of the quantum tube 40.

Figure 8:
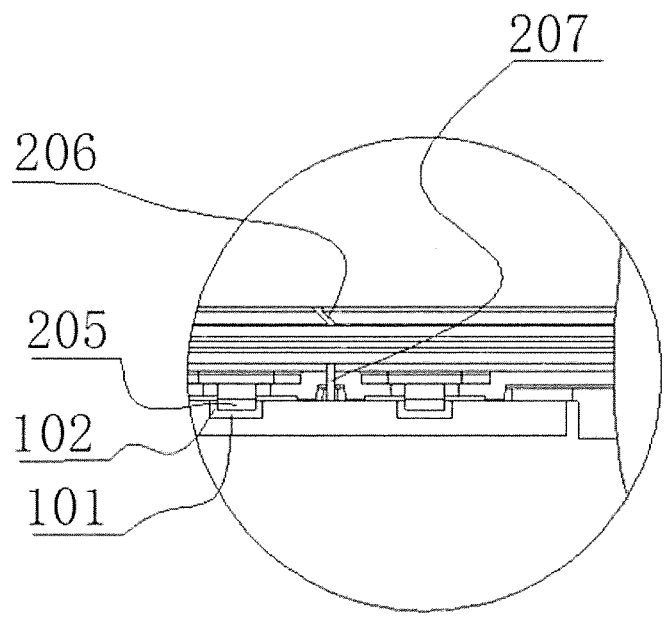
FIG. 8 is a schematic diagram of a local enlarged structure of portion D of FIG. 5.

Referring to FIG. 8, a gap 102 is provided between the insertion tongue 205 and the insertion hole 101 in the length direction of the quantum tube 40, and the insertion tongue 205 is movable in the insertion hole 101 along the length direction of the quantum tube 40, i.e., the insertion tongue 205 does not limit the displacement of the quantum tube bracket 20 on the bracket mounting portion 10 along the length direction of the quantum tube 40.

In conclusion, in the backlight module provided by the embodiments of the present disclosure, the quantum tube bracket 20 limits its displacement on the bracket mounting portion 10 along the width direction of the quantum tube 40 by the insertion tongue 205 and the screw 60, so as to achieve an accurate location in the width direction. In the length direction of the quantum tube 40, there is only one limiting point, i.e., the screw(s) 60, between the quantum tube bracket 20 and the bracket mounting portion 10. Thus the quantum tube bracket 20 can freely expand and extend towards both sides from the screw 60 on the bracket mounting portion 10 along the length direction of the quantum tube 40, which effectively solves the problem in the prior art that the quantum tube bracket is bent since on unit length its thermal elongation amount is larger than that of the bracket mounting portion, avoids the quantum tube from being broken due to the expansion and bending of the quantum tube bracket, and further improves the service life and safe reliability of the quantum tube. Meanwhile, in the backlight module provided by the embodiments of the present disclosure, the quantum tube bracket 20 is fixed on the bracket mounting portion 10 through the insertion tongue 205 and the screw 60 coordinated with each other, which allows the quantum tube bracket 20 to freely expand and extend towards both sides from the screw 60 on the bracket mounting portion 10 along the length direction of the quantum tube 40, and at the same time, limits rotation and deflection of the quantum tube bracket 20 on the bracket mounting portion 10, and ensures that the effective luminous region of the quantum tube 40 is always directly opposite to the edge type light source 30 and the light incident surface 501 of the light guide plate during the thermal expansion and extension of the quantum tube bracket 20, thus further guaranteeing the luminous efficiency of the quantum tube.

Figure 3B:
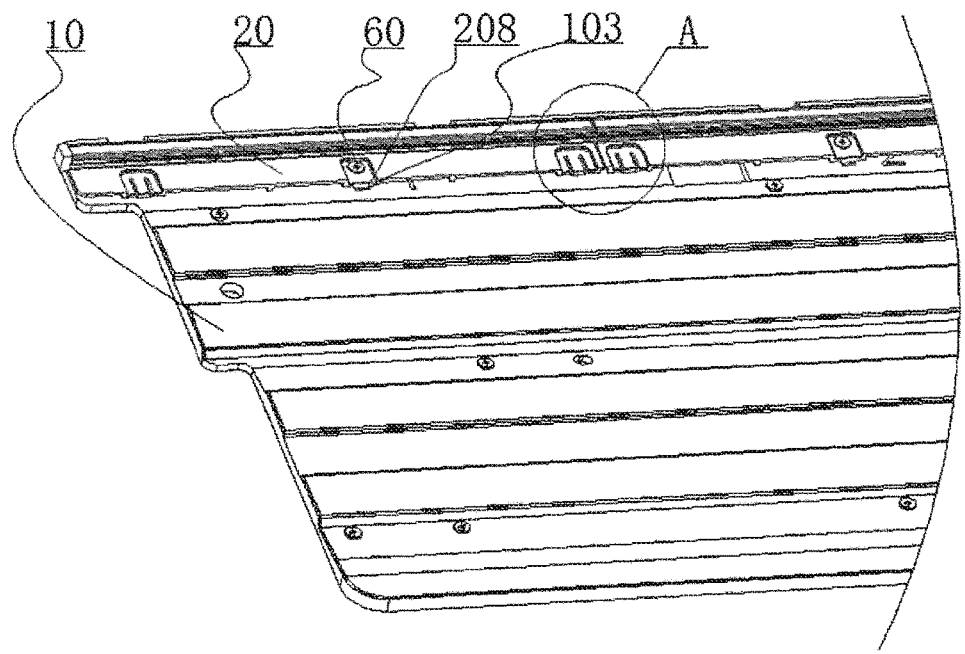
FIG. 3b is a schematic diagram of a structure of another modified embodiment of FIG. 3.
Figure 4:
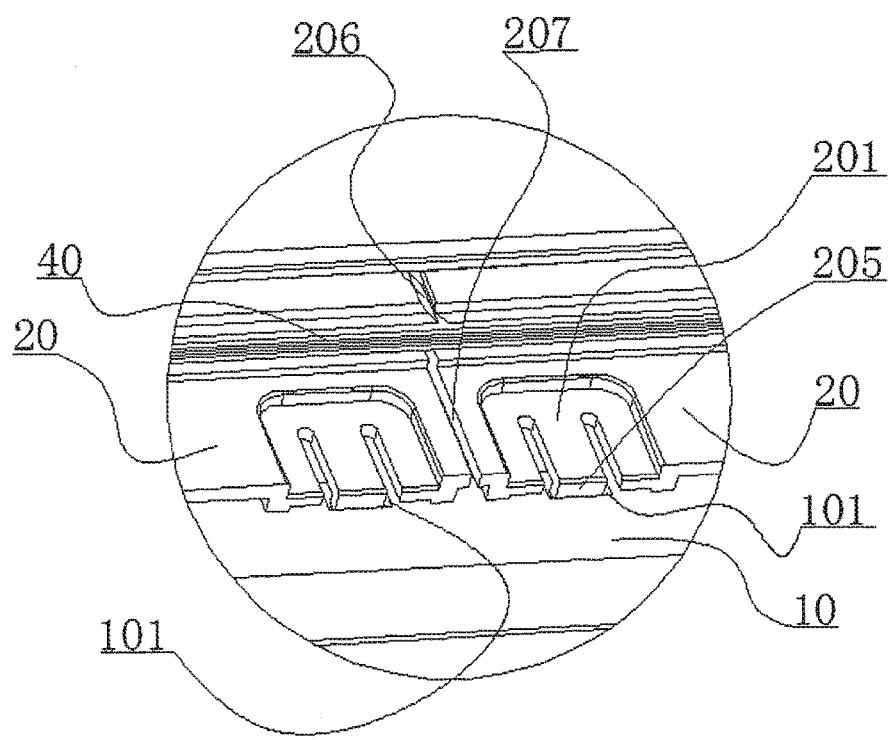
FIG. 4 is a schematic diagram of a local enlarged structure of portion A of FIG. 3b.

Further, referring to FIG. 3b, since there is only one limiting point, i.e., the screw 60, between each quantum tube bracket 20 and the bracket mounting portion 10 in the length direction of the quantum tube 40, in order to improve the reliability and stability of the entire connection between each quantum tube bracket 20 and the bracket mounting portion 10 in the length direction, preferably, a single quantum tube bracket 20 usually has a length from 5 cm to 20 cm to prevent both ends away from the screw 60 from raising under unreliable connections since the quantum tube bracket 20 is too long.

Figure 5:
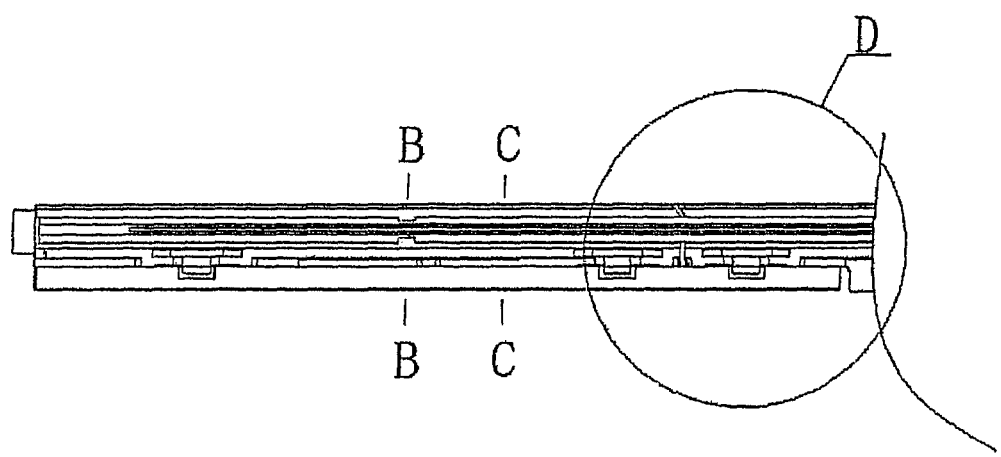
FIG. 5 is a schematic diagram of an assembly of a quantum tube bracket and a bracket mounting portion in one embodiment of the present disclosure.

Due to the length limitation of the quantum tube bracket 20, referring to FIGS. 3a, 4 and 5, a plurality of quantum tube brackets 20 spliced with each other are mounted on the bracket mounting portion 10 in its length direction, and their quantum tube receiving cavities 203 are arranged in the same straight line. The quantum tube 40 is fixed between the edge type light source 30 and the light incident surface 501 of the light guide plate through the quantum tube receiving cavities 203 of the plurality of quantum tube brackets 20. In which, referring to FIG. 4, an expansion gap 207 is provided between two adjacent quantum tube brackets 20 in the length direction of the bracket mounting portion 10, and when the quantum tube brackets 20 thermally expand and extend, no interference will occur between two adjacent quantum tube brackets 20.

The length of each one of the quantum tube brackets 20 and the size of each one of the expansion gaps 207 are not limited in the present disclosure, and may be designed by a person skilled in the art upon actual demand with reference to the prior art. The number of the quantum tube brackets 20 on the bracket mounting portion 10 is not limited in the present disclosure, and may be adaptively selected by a person skilled in the art upon actual demand.

Referring to FIGS. 5, 8 and 9, in order to reduce light leakage of the spliced seam between two adjacent quantum tube brackets 20 directly opposite to the edge type light source 30 and the light incident surface 501 of the light guide plate, a spliced slope 206 is provided at a spliced position at that place for two adjacent quantum tube brackets 20, i.e., as shown in FIG. 5, the spliced seam between two adjacent quantum tube brackets 20 is an inclined seam, which can effectively reduce light leakage of the spliced seam while ensuring the expansion size, in relation to the vertical seam.

Further, referring to FIGS. 3 and 9, the screw hole 202 may be provided at any position on the base 201, such as ¼, ⅓, ½, etc. in the length direction of the base 201. Preferably, the screw hole 202 is provided at the middle of the base 201, i.e., the central point of the base 201. In that case, the quantum tube bracket 20 has equal lengths at both sides of the screw hole 201, so as to ensure that the thermal elongation amounts of the quantum tube bracket at both sides of the one limiting point, i.e., the screw(s), are substantially the same, and for the convenience of setting equal expansion gaps 207.

In order to avoid the bending deformation of the quantum tube bracket in the length direction due to inaccurate screw location, referring to FIG. 3, a locating pin 208 is provided on the lower surface of the base 201 of the quantum tube bracket 20, and arranged side by side with the screw hole 202 along the width direction of the quantum tube 40. A locating hole 103 fitted with the locating pin 208 is provided at corresponding position on the bracket mounting portion 10, and the locating pin 208 is fitted with the locating hole 103 to achieve the accurate location between the quantum tube bracket 20 and the bracket mounting portion 10.

Further, the locating hole 103 has a size equal to that of the locating pin 208 in the length direction of the quantum tube 40, and a size larger than that of the locating pin 208 in the width direction of the quantum tube 40, i.e., the locating pin 208 is fitted with the locating hole 103 at zero clearance in the length direction of the quantum tube 40, and at a clearance in the width direction of the quantum tube 40, so as to achieve an accurate location of the quantum tube bracket 20 on the bracket mounting portion 10 along the length direction of the quantum tube 40, without influencing the accurate location of the quantum tube bracket 20 and the bracket mounting portion 10 along the width direction of the quantum tube 40, which is positioned by the insertion tongues 205 and the insertion holes 101. In the above fixing manner as shown in FIG. 3, the screw 60 is only used for a preliminary location to limit the displacements of the quantum tube bracket 20 and the bracket mounting portion 10 in the up-and-down direction, each insertion tongue 205 is fitted with each insertion hole 101 to achieve the accurate location of the quantum tube bracket 20 and the bracket mounting portion 10 along the width direction of the quantum tube 40, and the locating pin 209 is fitted with the locating hole 103 to achieve the accurate location of the quantum tube bracket 20 on the bracket mounting portion 10 along the length direction of the quantum tube 40. With this design, the embodiments of the present disclosure can realize the entire accurate location and the reliable connection of the quantum tube bracket on the bracket mounting portion, and further avoid the deformation of the quantum tube bracket caused by the mounting error.

The backlight module in the above one or more embodiments comprises a bracket mounting portion, an edge type light source, a light guide plate, a quantum tube and a quantum tube bracket, wherein the quantum tube bracket and the edge type light source are mounted on the bracket mounting portion, the thermal expansion coefficient of the quantum tube bracket is larger than that of the bracket mounting portion, and the quantum tube is fixed between the edge type light source and the light incident surface of the light guide plate by the quantum tube bracket, and wherein the quantum tube bracket is fixed on the bracket mounting portion by means of a single point of fixation along the length direction of the quantum tube. Usually, in the working process of the backlight module, the light source generates a lot of heat, thus the bracket mounting portion and the quantum tube bracket thermally expand. Since the thermal expansion coefficient of the quantum tube bracket is larger than that of the bracket mounting portion, on unit length, the expansion and elongation amount of the quantum tube bracket is larger than that of the bracket mounting portion. In the backlight module provided by the embodiments of the present disclosure, the quantum tube bracket is only fixed with one point on the bracket mounting portion along the length direction of the quantum tube, thus the quantum tube bracket can freely expand and extend from the fixing point on the bracket mounting portion along the length direction of the quantum tube, which effectively solves the problem in the prior art that the quantum tube bracket is bent since on unit length its thermal elongation amount is larger than that of the bracket mounting portion, avoids the quantum tube from being broken due to the expansion and bending of the quantum tube bracket, and further improves the service life and safe reliability of the quantum tube.

In addition to the structures as shown in FIGS. 2 to 10, the backlight module provided by the embodiments of the present disclosure may further comprise a backboard, a frame structure, a middle frame, optical films, etc. In which, for example, the backboard may act as a bracket mounting portion 10 as shown in FIG. 2, or the backboard may additionally be provided below the bracket mounting portion 10; the frame structure is mounted on an outer surface of the bracket mounting portion 10 away from the edge type light source 30 to support the display screen of the liquid crystal display; the optical films may cover the light emergent surface 502 of the light guide plate 50. As to other components of the backlight module of the embodiments of the present disclosure, a person skilled in the art may refer to the structure of the backlight module disclosed in the prior art, and the present disclosure does not make any limitation.

The embodiments of the present disclosure further provide a liquid crystal display which comprises a liquid crystal display screen and a backlight module as shown in any one of FIGS. 2 to 10, and thus has the advantages of the backlight module as shown in any one of FIGS. 2 to 10. For example, the liquid crystal display screen further comprises an array substrate and a color filter substrate opposite to each other and provided on the backlight module, and a liquid crystal molecular layer provided between the array substrate and the color filter substrate.

Other compositions of the backlight module and the liquid crystal display in the embodiments of the present disclosure are well known to a person skilled in the art, please refer to the prior art and herein are omitted.

In the descriptions herein, the specific features, structures, material or characteristics may be combined appropriately in any one or more embodiments or examples.

The above descriptions are just specific embodiments of the present disclosure, and the protection scope of the present disclosure is not limited thereto. Any change or replacement easily conceivable for those familiar with this technical field within the technical scope disclosed by the present disclosure, shall be covered by the protection scope of the present disclosure. Therefore, the protection scope of the present disclosure shall be determined by that of the claims.

What is claimed is:

1. A backlight module, comprising:
a bracket mounting portion provided with an edge type light source and at least one quantum tube bracket, a thermal expansion coefficient of the quantum tube bracket being larger than that of the bracket mounting portion;
a light guide plate including a light incident surface and a light emergent surface, the light incident surface being opposite to the edge type light source; and
a quantum tube mounted between the edge type light source and the light incident surface by the at least one quantum tube bracket,
wherein the quantum tube bracket is fixed on the bracket mounting portion by means of a single point of fixation along a length direction of the quantum tube; the quantum tube bracket comprises a base, a side wall which extends away from the base, and a top wall which extends away from the side wall in a direction that is parallel to the base, the base, the side wall and the top wall forming a cavity for receiving the quantum tube; the side wall being provided with at least one through-hole, through which light is transmitted from the edge type light source to the quantum tube, and
wherein a total length of the at least one quantum tube bracket is substantially equal to a length of the bracket mounting portion.

2. The backlight module according to claim 1, wherein
at least one insertion tongue is provided on a lower surface of the base and extends away from the edge type light source,
at least one insertion hole fitted with the insertion tongue is provided on the bracket mounting portion and forms an recess on the bracket mounting portion, and
the insertion tongue is mountable in the insertion hole.

3. The backlight module according to claim 2, wherein the insertion tongue is fitted with the insertion hole at a clearance along the length direction of the quantum tube.

4. The backlight module according to claim 1, wherein a screw hole is provided on the quantum tube bracket, a fixing screw is provided between the quantum tube bracket and the bracket mounting portion, and the fixing screw is mounted in the screw hole.

5. The backlight module according to claim 4, wherein a locating pin is provided on a lower surface of the base and is arranged side by side with the screw hole along a direction that is perpendicular to the length direction of the quantum tube, and a locating hole fitted with the locating pin is provided on the bracket mounting portion.

6. The backlight module according to claim 5, wherein the locating pin is fitted with the locating hole at a clearance along the width direction of the quantum tube.

7. The backlight module according to claim 1, wherein the bracket mounting portion is provided with at least two quantum tube brackets, and a gap is provided between two adjacent quantum tube brackets.

8. The backlight module according to claim 7, wherein a spliced surface between two adjacent quantum tube brackets is an inclined surface.

9. The backlight module according to claim 5, wherein the screw hole is provided at a middle of the base.

10. A liquid crystal display comprising a backlight module that includes:
a bracket mounting portion provided with an edge type light source and at least one quantum tube bracket, a thermal expansion coefficient of the quantum tube bracket being larger than that of the bracket mounting portion;
a light guide plate including a light incident surface and a light emergent surface, the light incident surface being opposite to the edge type light source; and
a quantum tube mounted between the edge type light source and the light incident surface by the at least one quantum tube bracket,
wherein the quantum tube bracket is fixed on the bracket mounting portion by means of a single point of fixation along a length direction of the quantum tube; the quantum tube bracket comprises a base, a side wall which extends away from the base, and a top wall which extends away from the side wall in a direction that is parallel to the base, the base, the side wall and the top wall forming a cavity for receiving the quantum tube; the side wall being provided with at least one through-hole, through which light is transmitted from the edge type light source to the quantum tube, and
wherein a total length of the at least one quantum tube bracket is substantially equal to a length of the bracket mounting portion.

11. The liquid crystal display according to claim 10, wherein
at least one insertion tongue is provided on a lower surface of the base and extends away from the edge type light source,
at least one insertion hole fitted with the insertion tongue is provided on the bracket mounting portion and forms an recess on the bracket mounting portion, and
the insertion tongue is mountable in the insertion hole.

12. The liquid crystal display according to claim 11, wherein the insertion tongue is fitted with the insertion hole at a clearance along the length direction of the quantum tube.

13. The liquid crystal display according to claim 10, wherein a screw hole is provided on the quantum tube bracket, a fixing screw is provided between the quantum tube bracket and the bracket mounting portion, and the fixing screw is mounted in the screw hole.

14. The liquid crystal display according to claim 13, wherein a locating pin is provided on a lower surface of the base and is arranged side by side with the screw hole along a direction that is perpendicular to the length direction of the quantum tube, and a locating hole fitted with the locating pin is provided on the bracket mounting portion.

15. The liquid crystal display according to claim 14, wherein the locating pin is fitted with the locating hole at a clearance along the width direction of the quantum tube.

16. The liquid crystal display according to claim 10, wherein the bracket mounting portion is provided with at least two quantum tube brackets, and a gap is provided between two adjacent quantum tube brackets.

17. The liquid crystal display according to claim 16, wherein a spliced surface between two adjacent quantum tube brackets is an inclined surface.

18. The liquid crystal display according to claim 14, wherein the screw hole is provided at a middle of the base.

19. The backlight module according to claim 2, wherein, the insertion tongue has at least two furcations.

20. The liquid crystal display according to claim 11, wherein, the insertion tongue has at least two furcations.

\* \* \* \* \*